United States Patent
Kreutzig

(10) Patent No.: US 10,101,573 B1
(45) Date of Patent: Oct. 16, 2018

(54) OPTICAL FILTER

(71) Applicant: Spectrum Technologies International, Ltd., Woodridge, IL (US)

(72) Inventor: Kirk Kreutzig, Woodridge, IL (US)

(73) Assignee: SPECTRUM TECHNOLOGIES INTERNATIONAL LTD., Woodridge, IL (US)

( * ) Notice: Subject to any disclaimer, the term of this patent is extended or adjusted under 35 U.S.C. 154(b) by 0 days.

(21) Appl. No.: 15/587,919

(22) Filed: May 5, 2017

(51) Int. Cl.
| | |
|---|---|
| *H01L 31/00* | (2006.01) |
| *G02B 23/12* | (2006.01) |
| *G02B 5/20* | (2006.01) |
| *G02B 25/00* | (2006.01) |

(52) U.S. Cl.
CPC ............ *G02B 23/12* (2013.01); *G02B 5/208* (2013.01); *G02B 25/001* (2013.01)

(58) Field of Classification Search
CPC ..... G02B 23/12; G02B 25/208; G02B 25/001

USPC .......................................................... 250/330
See application file for complete search history.

(56) References Cited

U.S. PATENT DOCUMENTS

| | | | |
|---|---|---|---|
| 6,158,865 A * | 12/2000 | Kreutzig ................. | G02B 5/20 351/213 |
| 8,699,158 B1 * | 4/2014 | Kreutzig ................ | G02B 5/223 359/885 |

\* cited by examiner

*Primary Examiner* — David Porta
*Assistant Examiner* — Meenakshi Sahu
(74) *Attorney, Agent, or Firm* — Todd S. Parkhurst; Greensfelder Hemker & Gale PC

(57) ABSTRACT

This patent application discloses the use of specialized optical filters or similarly functional devices to improve the utility of Night Vision Devices (NVD) by placing these specialized filters in the internal optics train of the eyepiece such that the undesirable illumination of the user's face is reduced while at the same time maintaining the peripheral vision of the user and concomitantly reducing the dark adaptation time of the user when transitioning from the NVD to the unaided eye.

1 Claim, 3 Drawing Sheets

OPTICAL FILTER

CROSS-REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

BACKGROUND

This invention relates generally to Night Vision Devices, and more specifically to the placement of an optical filter or similarly functional device in relation to the Night Vision Device and to the device user's eye.

Night Vision Devices (NVDs) refer to a group of electronic devices used to augment the vision of the user in low light and/or dark conditions. There are at least four classes of such devices distinguished by the type of illumination amplified by their respective electronics: image intensifiers, near infrared imaging, thermal imaging and combinations of these called fusion devices. Other types of devices may include infrared sources to illuminate the scene.

These NVDs utilize a display to convert the electronic signals from the detectors into an image visible by the human eye. Depending on the type of ENVD, the image display may be an analog phosphor typified by the NVD AN/PVS-14 Image Intensifier P-43 phosphor or a digital display in black & white or color as typified by the RECON III or a display that optically combines the two display types typified by the ENVG.

It is a well-known fact that such displays are sufficiently bright to cause the eye to function in the photopic regime or the mesopic intermediate regime between photopic and scotopic. The human eye has two modes of function depending on the incident illumination levels (e.g. Duplicity Theory as discussed in Graham (Editor) Vision and Visual Perception, John Wiley and Sons, 1966). In this regard, the term "photopic" refers to the eye function at a relatively high level of illumination (daylight) and "scotopic" refers to function at relatively low light levels (night). Acuity and color sensitivity are significantly better for the photopic regime; sensitivity to low illumination is significantly better with scotopic vision.

An important factor is the time period required to transition from photopic to scotopic vision, a phenomenon termed dark adaptation time. Depending on prior conditions, this dark adaptation time can be 45 minutes or longer. During this transition, the eye has difficulty detecting objects resulting in a condition called night blindness. Because the NVD display is bright, therefore when the user of the NVD removes the device or looks away from the display, he/she endures night blindness during the dark adaptation time.

Special filters such as that disclosed in Kreutzig U.S. Pat. No. 6,158,865 have been designed to shorten the dark adaptation time and reduce this night blindness.

It is important that any optical filter employed to reduce the facial signature function to maintain the user's peripheral vision, to reduce the dark adaptation time, and yet work properly with all types of image displays.

The displays of the NVDs produce a general illumination of the user's face and/or eye socket. Termed facial signature or splash, this is very undesirable because it will disclose the presence and location of the NVD user to hostile persons who happen to be looking in the direction of the NVD user. As illustrated in FIG. 1, the NVD 2 is utilized by the wearer 1 by holding the NVD up to the eye and viewing through the attached eyepiece 3 but not touching the facial surface surrounding the eye. This existing design results in a portion of the face 4 being illuminated by the display of the NVD which is undesirable.

Attempts to reduce this facial signature by placement of standard accordion rubber eyecups on the eyepiece that interface tightly to the user's eye essentially eliminate the user's peripheral vision. This result significantly and detrimentally compromises the user's situational awareness when using an NVD with such an eyecup. In FIG. 2, a flexible eyecup 5 made of pleated rubber is frequently attached to the eyepiece 3 in order to block this illumination of the face. Note that because the flexible eyecup 5 touches the face, the peripheral vision of the use is significantly reduced. This is undesirable.

Some previous designs have placed filters over the final optical element of the eyepiece. In FIG. 3, an optical filter 6 is attached to the eyepiece 3 which reduces the illumination 7 on the user's face. These filters are described in Kreutzig patent U.S. Pat. No. 8,226,251.

While this succeeds in a major objective as described above, placement of the filter in this location subjects the filter to scratching, difficulty of field installation and outright loss of the filter.

OBJECTIVES AND SUMMARY OF THE INVENTION

It is the object of this invention to provide a system that utilizes placement of the filter or similarly functional device in the interior of the NVD eyepiece optical train and therein obviates scratching, difficult field installation and loss of the filter.

Furthermore, it is the object of this invention to disclose the use of specific optical filters for all types of Night Vision Devices. These filters will significantly reduce the dark adaptation time of the user and therefore improve the ease and safety of use of the filtered NVD without degradation of the NVD performance.

To accomplish these objects, the invention comprises the placement of an optical filter internally in the optical train of the eyepiece. This optical filter has light transmissive characteristics shown in the accompanying table:

TABLE 1

| Wavelength (nm) | % Transmission |
|---|---|
| Ranges from about 390 to about 410 | 0.1 |
| Ranges from about 410 to about 415 | 10 |
| Ranges from about 420 to about 430 | 27 |
| Ranges from about 445 to about 455 | 15 |
| Ranges from about 460 to about 475 | 9 |
| Ranges from about 490 to about 505 | 6 |
| Ranges from about 510 to about 525 | 7 |
| Ranges from about 540 to about 550 | 18 |
| Ranges from about 560 to about 576 | 50 |
| Ranges from about 590 to about 606 | 87 |
| Ranges from about 690 to about 707 | 90 |
| Ranges from about 750 to about 1000 | 90 |

When a filter having such characteristics is provided, the user/observer can adequately see the light emitted from the light emitting display. However, in accordance with the invention, that light emitted from the display and passing through the filter is modified so as to reduce splash-back on the observer's face.

Furthermore when using the Night Vision optical filter, the time required for the user's eyes to dark adapt is reduced as reported in THOMAS et. al., "Optical Filter Effects on Night Vision Goggle Acuity and Preservation of Dark Adaptation", Aviation and Space Environ Med 2010; 81: 869-72.

DETAILED DESCRIPTION OF THE PREFERRED EMBODIMENT

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
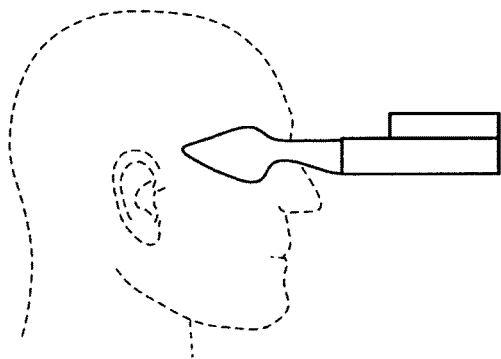
FIG. 1 is a representation of the undesirable facial illumination caused by the Night Vision Device display.
Figure 2:
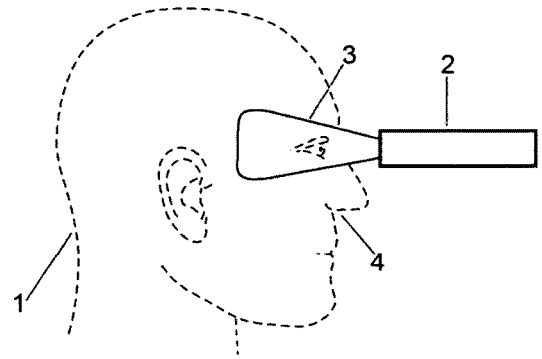
FIG. 2 is a representation of the rubber eyepiece commonly used to reduce the facial signature but sacrificing the peripheral vision of the user.
Figure 3:
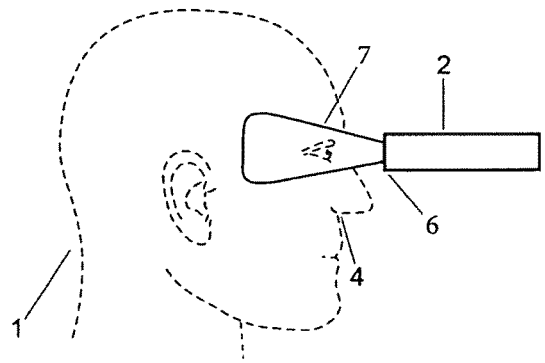
FIG. 3 is a representation of the optical filter placed in the external eyecup of an NVD.
Figure 4:
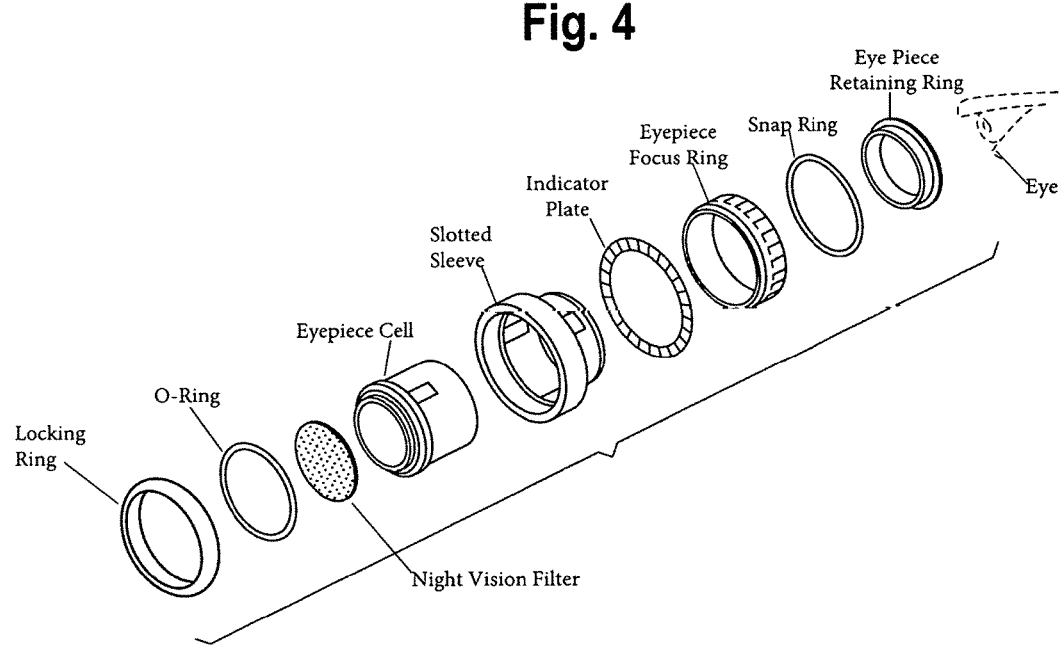
FIGS. 4 and 5 are exploded views of a PVS-14 NVG eyepiece showing the placement of the optical filter and the user's eye. The eyepiece cell component is modified to accept the optical filter.
Figure 5:
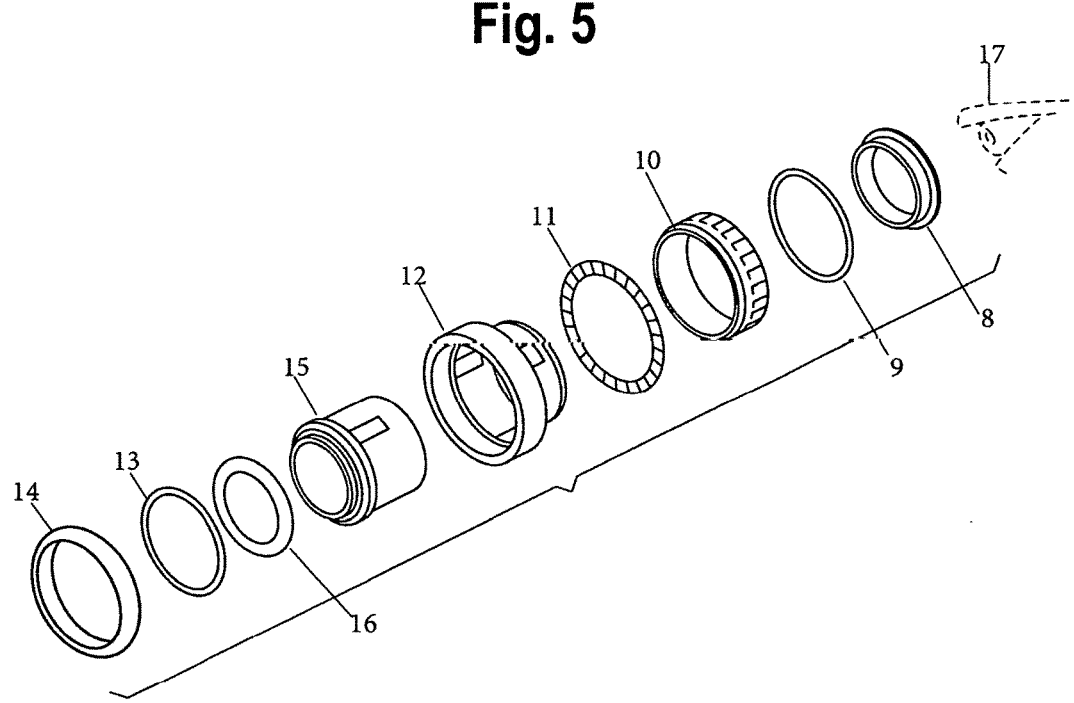

FIG. 4 diagrams the internal integration of the filter in a typical eyepiece of the NVS-14. The user's eye 17 is positioned at the end of the eyepiece assembly. The eyepiece assembly is attached to the NVD body by means of the threaded locking ring 14. Element 8 is a threaded retaining ring which is mounted on the optical cell collar 12. Element 9 is a retaining ring. Knurled ring 10 is rotated by the operator to achieve focus with fiduciary ring 11 providing indication to the operator of the adjustment. The optical cell collar 12 utilizes the grooves on the side of the optical cell 15 to effect longitudinal movement of elements 8, 9, 10, 11, and 12. The optical cell 15 contains the focusing lens elements. Elements 8, 9, 10, 11, and 12 serve in conjunction to move the eyepiece cell 15 with mounted optical filter 16 longitudinally along the optic axis in order to achieve proper focus of the displayed image to the operator. The optical filter 16 is retained in position to the eyepiece cell by an O-ring 13 and the locking ring 14.

The filter 16 can have optical properties of the sort disclosed in U.S. Pat. No. 6,158,865.

The following is claimed as invention:

1. An optical filter for use by an observer with a night vision appliance, the filter comprising a filter eyepiece placed with respect to the night vision appliance so that it is optically interposed between an appliance light emitting display and the observer's face, the optical filter having light transmissive characteristics such that the observer can adequately see light emitted by the light emitting display but having such characteristics that light emitted from the display and passing through the filter is modified so as to reduce splash-back on the observer's face, the night vision appliance including a light amplifier for amplifying light emissions from a distant subject and presenting said amplified emissions as a visual display, said light amplifier being capable of amplifying electromagnetic emissions in the mid-infrared and far infrared range, and wherein said optical filter has optical properties which reduce light splash in the visible light range onto the face of the user.

* * * * *